Jan. 7, 1930.   L. M. FARRELL   1,742,242
CAR BRAKE MECHANISM
Filed April 19, 1928   2 Sheets-Sheet 1

Inventor
Luke M. Farrell

By Clarence A. O'Brien
Attorney

Jan. 7, 1930.　　　　　L. M. FARRELL　　　　　1,742,242
CAR BRAKE MECHANISM
Filed April 19, 1928　　　2 Sheets-Sheet 2
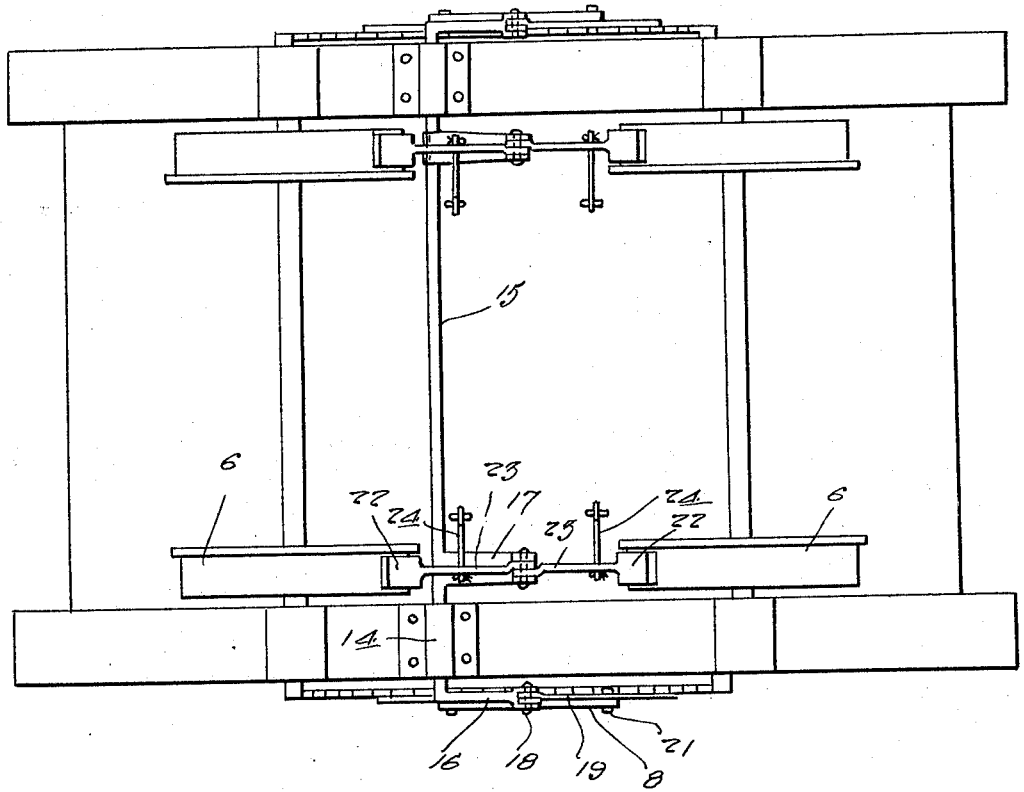
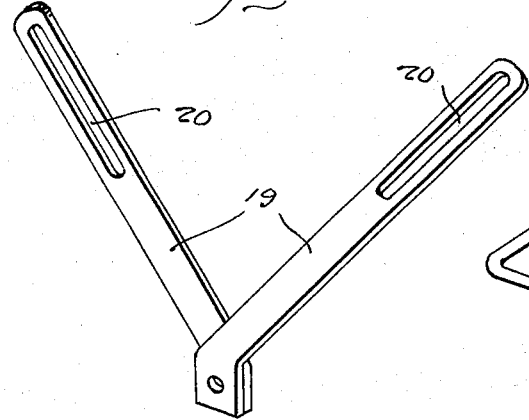
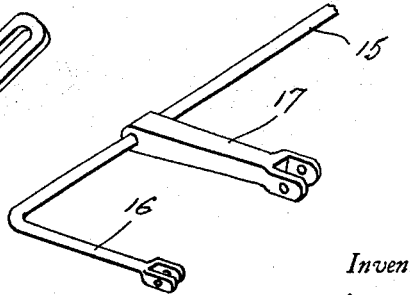
Inventor
Luke M. Farrell
By Clarence A. O'Brien
Attorney Patented Jan. 7, 1930

1,742,242

UNITED STATES PATENT OFFICE

LUKE M. FARRELL, OF SCRANTON, PENNSYLVANIA

CAR-BRAKE MECHANISM

Application filed April 19, 1928. Serial No. 271,221.

The present invention relates to a brake mechanism especially designed for use upon mine cars, although not necessarily limited to this particular use.

The prime object of the invention resides in the provision of a brake mechanism of this nature which is simple in its construction, compact and convenient in its arrangement of parts, inexpensive to manufacture, strong and durable, and thoroughly efficient and reliable in operation.

Another very important feature of the invention resides in the provision of a brake mechanism of this nature which may be actuated from either side of the car, by means of a pair of levers, one on each side of the car, said levers being so constructed and having associated parts that the levers may be moved either forwardly or rearwardly for applying the brakes.

With the above and numerous other objects in view, as will appear as the description proceeds, the invention resides in certain novel features of construction, and in the combination and arrangement of parts as will be hereinafter more fully described and claimed.

In the drawing,

Figure 2 is a bottom plan view thereof.

Figure 4 is a perspective view of one pair of actuating links, and

Figure 5 is a fragmentary perspective view of one end of a crank shaft.

Figures 1, 3:
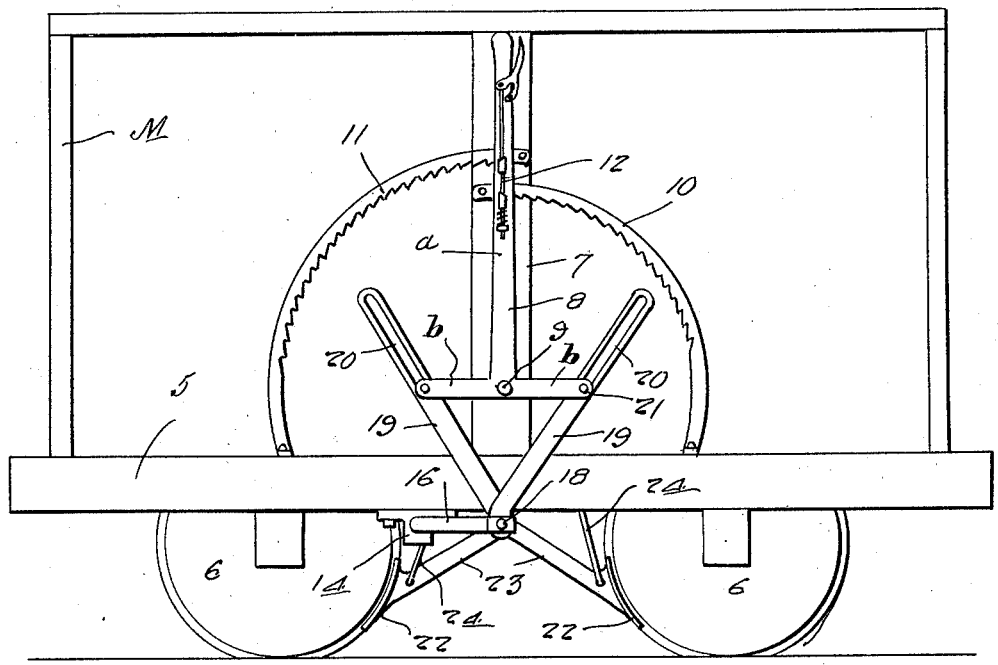
Figure 1 is a side elevation of a mine car embodying the features of my invention.
Figure 3 is a fragmentary vertical transverse section therethrough.

Referring to the drawing in detail, it will be seen that the numeral 5 denotes the longitudinal beams of an ordinary mine car M, which are mounted on the wheeled truck of conventional construction, including wheels 6, two of which are disposed to each side of the transverse center of the car. On each side center upright, 7, are pivotally mounted an inverted T-shaped lever as at 8. Each inverted T-shaped lever comprises a handle portion A, and a pair of crank portions B. A rack quadrant 10 is attached to the upright 7 and the adjacent side longitudinal beam 5, in one direction, and a similar quadrant 11 is similarly attached in the other direction. A suitable pawl mechanism 12 is provided on the handle portion A of the lever 8 to engage these quadrants, depending, of course, upon which direction the lever is rocked.

Bearing brackets 14 are attached to the beams 5, and have rockable therein a shaft 15, with end cranks 16, and intermediate cranks 17. With each crank 16, there is pivotally engaged, as at 18, a pair of links 19, the extremities of which are provided with elongated slots 20, into which extend pins 21, at the ends of the crank portion B of the levers 8. A brake shoe 22 is associated with each wheel 6 and has a shank 23. The shanks 23 are suspended by means of hangers 24 attached to the bottom of the car M and the extremities of the shanks are pivotally engaged with the extremities of the cranks 17.

From the above detailed description, it will be seen that if either lever is rocked in either direction, the brakes will be applied by pushing downwardly on one of the links 19 and rocking downwardly on the crank 16, attached thereto, thereby rocking the crank shaft 15, to rock downwardly on the cranks 17 thereof, thereby rocking the shanks 23 on their hangers and applying the brakes with considerable leverage, which is multiplied through the action of the lever 8 and the crank shaft 15 and the cranks 23. Thus it will be seen that I have devised an extremely simple construction which is convenient to operate and will effectively and efficiently apply the brakes with great power. The great convenience of the device is that the brake mechanism may be operated from either side of the mine car, and the levers may be pushed in either direction for applying the brakes.

It is thought that the utility and advantages of this invention will now be quite apparent to those skilled in this art, without a more detailed description thereof. The present embodiment of the invention has been disclosed in detail, merely by way of example, since in actual practice it attains the features of advantage enumerated as desirable in the statement of the invention and the above description. It will be apparent that changes in the details of construction and in the combination and arrangement of parts may be resorted to, without departing from the spirit or scope of this invention as hereinafter claimed or sacrificing any of its advantages.

Having thus described my invention, what I claim as new is:

1. A brake mechanism of the class described for a mine car, wherein the mine car includes a pair of front wheels, and a pair of rear wheels comprising a plurality of brakes, one for each wheel, shanks extending from the brakes and inclined upwardly toward the center of the car, hangers pivotally mounting the shanks adjacent the brakes, a shaft rockable on the car and having cranks engaged with the shanks at their upper ends, said shaft having additional cranks at its ends, a pair of links engaged with each additional crank and extending upwardly and having slots at their upper ends, T-shaped levers pivotally mounted on the car, one to each side thereof and having pins engaged in the slots of the links.

2. A brake mechanism of the class described for a mine car, wherein the mine car includes a pair of front wheels, and a pair of rear wheels, comprising a plurality of brakes, one for each wheel, shanks extending from the brakes and inclined upwardly toward the center of the car, hangers pivotally mounting the shanks adjacent the brakes, a shaft rockable on the car and having cranks engaged with the shanks at their upper ends, said shaft having additional cranks at the ends, a pair of links engaged with each additional crank and extending upwardly and having slots at their upper ends, T-shaped levers pivotally mounted on the car, one to each side thereof and having pins engaged in the slots of the links, a pair of racks associated with each lever, and a pawl mechanism on each lever for engaging the racks.

In testimony whereof I affix my signature.

LUKE M. FARRELL.